Nov. 10, 1942.  E. E. HOWE  2,301,280
SEALING MEANS
Filed Oct. 23, 1941
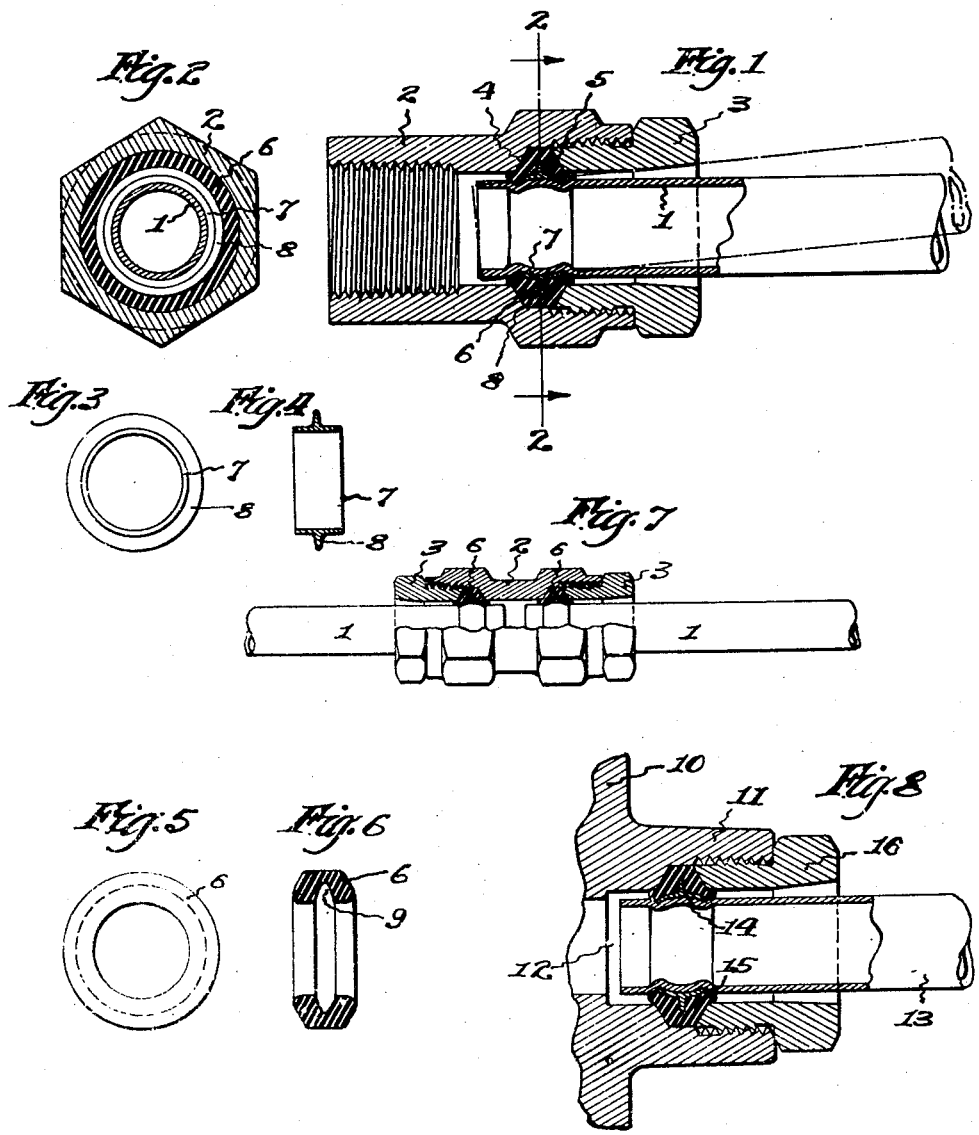
INVENTOR.
Earl E. Howe
BY
ATTORNEY.

Patented Nov. 10, 1942

2,301,280

UNITED STATES PATENT OFFICE 2,301,280

SEALING MEANS

Earl E. Howe, Royal Oak, Mich., assignor to Chicago Forging & Manufacturing Company, Chicago, Ill., a corporation of Illinois Application October 23, 1941, Serial No. 416,235

4 Claims. (Cl. 285—90)

My invention relates generally to connections for tubing or pipes having thin walls. A principal object of my invention is a fluid tight connection for tubing that includes a resilient member that provides for limited universal movement of the tubing, cushioning the tubing against vibration, metal fatigue and constant danger of breaking of same.

Another object of my invention, is to provide a connection that offers a fluid tight seal for fluids at high pressures, as well as having a sound deadening effect on the line in which it is used.

Various flexible constructions have been presented having some of these features, but certain objections have been apparent, one of them being that they would fail at high pressures and it is an object of my invention to provide a connection having enough flexibility and strength to withstand the high pressures to which they are often subjected. While connections of limited flexible movement have been offered, the fact that they could not stand even reasonably high pressures has kept them from being used commercially and rigid metal to metal connections which are subject to leakage and danger of tube breakage due to metal fatigue induced by vibration to which they are subjected have been and are used almost altogether. These rigid connections generally have a flared end on the tube, which is subject to splitting resulting in leakage and often tube breakage. The other point of weakness and often failure of the tube is where it leaves the connection or fitting as it is here that it is most subject to localized metal fatigue due to vibration. Various methods have been used to prevent undue localization of stresses with only limited success because of a too rigid connection and metal to metal contact. When these connections are pulled down for service the tubes are usually cut off and reflared to insure against fracture or failure. My invention provides a connection that is flexible to a degree of angulation not heretofore reached and one that will withstand either high or low pressures without the tube pulling out of the connection. This coupling can also be disassembled for service easily and without changing its original effectiveness upon re-assembly.

Further objects and advantages of my novel construction will become apparent and more readily understood by reference to the accompanying drawing, in which Fig. 1 is a longitudinal diametric sectional view of a connection showing one form of my invention, Fig. 2 is a diametric cross-section taken on the line 2—2 of Fig. 1, Fig. 3 is a plan view of the ferrule, Fig. 4 is a longitudinal cross-section through the ferrule, Figs. 5 and 6 are views showing the resilient, sealing member in side elevation and transverse section respectively, Fig. 7 is a side elevation of a union type of fitting made according to my invention, partially broken away for purposes of explanation, and Fig. 8 is a longitudinal diametric sectional view showing the tube connected directly to a housing without the use of an adapter.

In the drawing, like numerals refer to like parts and in Fig. 1, I designates the end of a tubing which terminates in an adapter 2 of a connection. The adapter is threaded internally to receive a threaded compression nut 3 of less internal diameter than the outside diameter of the tubing 1. The adapter 2 has a bevelled shoulder 4 with the short end of the adapter having approximately the same diameter as the inside diameter of the compression nut 3. The end of the compression nut has an end 5 which is bevelled in opposite direction to the shoulder 4, thus leaving a tapered opening into which the packing which forms the subject matter of this invention extends. The tube 1, as shown, is of the thin wall type and can be made of any material such as steel, copper, brass, aluminum, or the like, and has thin walls which can be of any diameter.

The packing is composed of a grommet 6 of rubber-like material and a ferrule 7. The ferrule is placed in position over the end of the tube, the inside diameter being a fit over the outside diameter of the tube. A forming tool or die is now brought into place against the cylindrical walls of the ferrule at each side of a rib 8, and the outer edges thereof are "rolled in" or swedged into the wall of the tube, preferably, on an arc with center thereof in the middle of the tubular member. The tube is formed down under the ferrule so that the ferrule becomes fixed with respect thereto so that it cannot be removed except by cutting or destroying. Before the metal ferrule is swedged, or "rolled in," on the tube, the compression nut is placed in position on the tube because same cannot be placed in position afterwards due to the larger diameter of the rib 5, unless it can be inserted over the opposite end of the tube. The resilient member 6 is made of rubber or other resilient material dependent upon the liquid or gas to be conducted and is buttoned into position over the rib 8, the member 6 being provided with a groove 9 for this purpose, as best seen in Fig. 6.

Tightening of the compression nut member squeezes the resilient member down on the ferrule thus preventing the withdrawal of the tube and its ferrule while the compression nut is in position and at the same time affording an effective seal of the gas or fluid being transmitted. I have found that very little pressure on a resilient material is required to afford an effective seal even for the higher pressures, a finger tightening of the compression nut will effectively seal against leakage even for comparatively high pressures. This, however, is only made possible because end pressure is taken by the ferrule fixed to the tube, the rib of which keeps the tube from pulling out of the groove in the resilient gasket or grommet. The spacing between the tube 1 and the compression nut is to allow a limited angular movement without contact with the walls of the tube. In Fig. 7, I have shown the joining of two tubes which is often required. The means and construction are a duplication of what has been above described and the same numerals apply to corresponding parts.

In Fig. 8 is shown a tube joined directly to a housing member 10 instead of to an adapter, 11 being a boss which has a cylindrical bore 12 to receive the tube 13, the ferrule 14 and the grommet 15. The boss 11 is threaded at its outer end to receive the compression nut 16, the boss and the compression nut being likewise formed with opposed beveled portions as and for the purposes above described.

In the constructions as shown in Figs. 1 to 8, I have stated that the ferrule member is "rolled in" or set by a die or forming tool. While this is preferable the ferrule may be set into position on the tube by the compression of the resilient member should same be desired. A predetermined pressure on the resilient member is usually preferred dependent upon the degree of flexibility on the tube desired and the internal pressures with which it is used.

In the application and use of the joint or connection herein described, the inner faces of the members 2 and 3 define a pressure chamber. It will be observed that the member 3 is apertured to admit an end of the tube 1, there being preferably a relatively small clearance between the tube 1 and the wall of the aperture. The rib 8 is of a radial diameter somewhat greater than the inner diameter of the aperture of the member 3. The grommet 6 constitutes a deformable, or distortable mass which, as shown in Figs. 1 and 8, entirely fills the pressure chamber when the parts are in assembled position.

What I claim is:

1. In a high pressure joint, a tube; a ferrule surrounding and secured to the tube adjacent an end of the tube, and having an outwardly extending rib; a mass of flexible, distortable sealing material surrounding said ferrule and rib; a member to which said tube is connected, said member having a chamber for receiving and surrounding said sealing material, said chamber formed by a plurality of relatively movable chamber elements, one of said elements having an aperture through which the end of the tube extends, the clearance between the tube and said aperture being less than the radial extension of the rib from the ferrule; and means for moving said chamber elements against opposite sides of the mass of sealing material, thereby to place said mass under pressure, said mass, when the elements are fully assembled, being effectively distorted to fill the space between the inner walls of the chamber elements and the tube.

2. In a high pressure joint, a tube having an outwardly extending rib adjacent an end thereof; a mass of flexible distortable sealing material surrounding said tube end and rib; a member to which said tube is connected, said member having a chamber for receiving and surrounding said sealing material, said chamber being formed by a plurality of relatively movable chamber elements, one of said elements having an aperture through which the ribbed end of the tube extends, the clearance between the tube end and said aperture being less than the radial extension of the rib from the tube end; and means for moving said chamber elements against opposite sides of the mass of sealing material thereby to place said mass under pressure, said mass, when the elements are fully assembled, being effectively distorted to fill the space between the inner walls of the chamber elements and the tube.

3. In a high pressure joint, a tube having an outwardly extending rib adjacent an end thereof; a mass of flexible distortable sealing material surrounding said tube end and rib; a member to which said tube is connected, said member having a chamber for receiving and surrounding said sealing material, said chamber being formed by a plurality of relatively movable chamber elements having opposed end surfaces inclined outwardly toward each other, one of said elements having an aperture through which the ribbed end of the tube extends, the clearance between the tube end and said aperture being less than the radial extension of the rib from the tube end; and means for moving said chamber elements against opposite sides of the mass of sealing material thereby to place said mass under pressure, said mass, when the elements are fully assembled, being effectively distorted to fill the space between the inner walls of the chamber elements and the tube, said mass being in direct sealing contact with said inner walls said rib and said tube.

4. In a high pressure joint, a tube; a ferrule surrounding and secured to the tube adjacent an end of the tube, said ferrule having a ring engaging the exterior of the tube, and a rib projecting outwardly from the ring, said ring being deformed into locking engagement with the exterior of the tube; a mass of flexible, distortable sealing material surrounding said ferrule and rib; a member to which said tube is connected, said member having a chamber for receiving and surrounding said sealing material, said chamber formed by a plurality of relatively movable chamber elements, one of said elements having an aperture through which the end of the tube extends, the clearance between the tube and said aperture being less than the radial extension of the rib from the ferrule; and means for moving said chamber elements against opposite sides of the mass of sealing material, thereby to place said mass under pressure, said mass, when the elements are fully assembled, being effectively distorted to fill the space between the inner walls of the chamber elements and the tube.

EARL E. HOWE.